Nov. 15, 1955  R. A. ADAMSON  2,724,042
ELECTRICALLY HEATED SOLDERING IRONS
Filed Aug. 25, 1953
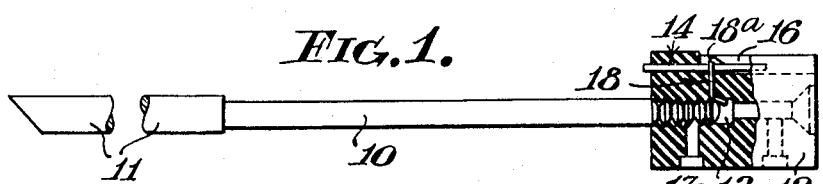
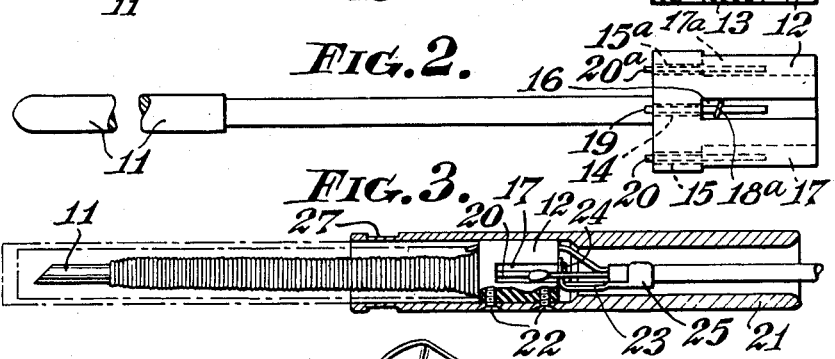
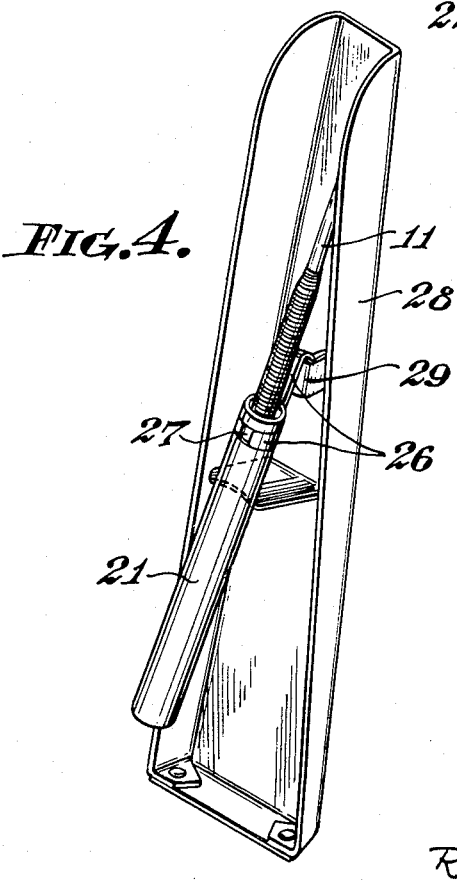
INVENTOR
ROBERT A. ADAMSON United States Patent Office 2,724,042
Patented Nov. 15, 1955

2,724,042

ELECTRICALLY HEATED SOLDERING IRONS

Robert Alfred Adamson, West Wickham, England

Application August 25, 1953, Serial No. 376,445

2 Claims. (Cl. 219—26)

This invention relates to electrically heated soldering irons. An object of the present invention is to provide an iron of simple construction and of small size, particularly suitable for delicate working such as wire soldering in electronic apparatus or instrument manufacture or repair. A further and important object of the invention is to provide an iron in which, although the parts are of small dimensions, adequate bonding or earthing of the bit and metal housing and other parts is obtained. Another and important object of the invention is to provide an arrangement which facilitates the assembly of the component parts of the iron, and enables all parts to be assembled and built up as a unitary and rigid complete structure ready for the connection thereto of the flexible lead or cable, so that the structure with the lead connected can then be secured to the handle. With an iron assembly in accordance with the present invention, a tubular handle can be used, and the assembly slipped thereinto to project from one end with the lead projecting from the other.

In order that a clear understanding of the invention may be obtained, reference will now be made to the accompanying drawings which illustrate, by way of example, a preferred construction of iron in accordance with the invention, and wherein:

Figure 1 is a side elevation, partly in section, of the bush with the rod supported thereby, and the rod earthing wire anchored in position.

Figure 2 is a view similar to Figure 1, but from above, showing the connecting wires in position.

Figure 3 is a side view of the finished iron, with part of the tubular handle broken away.

Figure 4 shows, in perspective, an iron supported on a bench stand.

Referring to the drawings, a rod-like core 10 is provided, having the bit 11 secured to its one end. The bit may be attached by screw means, or brazed, or a readily detachable, such as a sleeved bit, may be provided. The other end of the rod is secured to the bush 12 by threading said end and securing it in the axial hole 13 in the bush.

Three small holes 14, 15 and 15a are made through from the front face of the bush, each leading to a slot (16, 17, 17a respectively) in from the bush surface, the holes and slots being suitably spaced around the bush. A hole 18 is made through from the slot 16 into the hole 13 for the accommodation of a wire 18a for earthing the rod, this wire being locked or anchored by the action of screwing in the rod, the rod end and hole being suitably shaped so that the wire is held without breaking. The hole end wall is shouldered as shown and may have a groove to receive the wire end, or could be a blind hole, and the rod end is rounded.

After the rod has been secured, the main part thereof is wrapped in insulating material such as glass or asbestos wool or thread, or mica, and the connecting wires 19, 20, 20a placed in position, each in a slot and through the associated hole. The wires 20, 20a are for the connection of the ends of the heater wire, and the wire 19 is the earthing wire, the wire 18a being looped over the wire 19 and soldered thereto. After the heater has been built up, the ends are soldered to the wires, and (with suitable insulation interposed) the protective cover or sheath is fitted. As shown this cover consists of a close-wound metal wire, and its end adjacent the boss is soldered to the wire 19.

Thus the iron is completely assembled, as a unitary structure extending from a single bush. The leads of the flexible cable are connected to the rearwardly projecting ends of the wires 19, 20 and 20a. The handle employed is a tubular member 21 of insulating material, and the assembly is passed into the handle and locked by screws such as screws 22, so that the rod assembly projects from the one end and the flexible cable from the other.

The cable is suitably anchored to minimise the risk of breakage due to flexing in use. A hollow plug member can be fitted into the rear end of the handle, but preferably, and as shown, a spade-like retaining member 23 is provided, one end of which is retained on the rear of the bush 12 by means of a bolt 24, with the shank part of the member rearwardly projecting, the spade-like extremity 25 being bent up and on to the cable to anchor same. The tubular handle member 21 is preferably thickened internally to assist balance, and the rear end is slightly flared to prevent chafing.

The projecting rod and bit can be protected when not in use by a tubular cover (shown in broken lines in Figure 3) and a clip 26 may be provided, the body part of which is retained in a groove 27 around the member 21. If desired, the iron can be used in conjunction with a stand, an example of which is shown in Figure 4. The stand has an upright part 28, with a pressed-out part 29 for the engagement of a clip, and a turned-in base for screw-fixing to the bench.

In an alternative construction (not illustrated) an iron of T or hammer head form is provided. In this case an additional tubular handle member is provided which can be rectangular or oval in section and slotted at one end and clamped to the bush-supporting tube at a convenient angle. In this case, the flex can be passed through the additional tubular member.

The iron can be made of exceptionally small dimensions. Thus, it is possible to construct a mains-operated iron of an overall length of about six inches with the heater assembly of a diameter of about a quarter of an inch, with a bit size of about one eighth of an inch.

I claim:

1. An electrically heated soldering iron having a rod-like core around which rod the heating element is secured, with the soldering bit at the one end of the rod or core, characterised in that the rod is mounted in a bush which is provided with a tapped hole into which the threaded rod end opposite the bush screws, the bush having three spaced-apart holes extending from its front end and each leading into a slot in from the bush surface, there being received in each slot a rigid connecting wire, one end of each wire extending through and projecting from the associated slot hole, two of said projecting parts being for the attachment and connection of the heater wire ends, whilst the third is for the bonding or earth connection of a protective sheath or cover over the heating element and rod, there being provided a hole from this third slot into the tapped hole for a bonding wire, the inner end thereof contacting the threaded rod end with the said wire connected to the earth connection in the slot.

2. A soldering iron assembly for fitting into a hollow handle, comprising a supporting rod, a soldering bit carried at one end of said rod, a heater wire element carried by the bit and rod and wound over a part of the bit, a cylindrical bush of insulating material in which the rod end opposite the bit is secured in a hole axially of said bush and in from its front end, three slots in from the peripheral bush surface, each said slot extending from the rear of the bush forwardly and terminating short of the front end of the bush, holes through the bush from the front end surface one leading into each slot, a rigid wire in each hole and projecting into its slot, the front projecting end of two of said wires serving for the electrical connection of an end of the wire element, an outer metal protective cover comprising close helically wound wire extending from the bit up to the front end surface of the bush, the front projecting end of the third wire serving for the connections of the rear end of said cover wire, with the flexible lead wires soldered to the rigid wires in the slots, said bush being dimensioned for securing within the handle.

References Cited in the file of this patent

UNITED STATES PATENTS

| | | |
|---|---|---|
| 2,056,951 | Bohall et al. | Oct. 13, 1936 |
| 2,346,327 | Pfeiffer | Apr. 11, 1944 |
| 2,437,747 | Kuhn et al. | Mar. 16, 1948 |
| 2,518,265 | Adamson | Aug. 8, 1950 |

FOREIGN PATENTS

| | | |
|---|---|---|
| 556,609 | Great Britain | Oct. 13, 1943 |
| 562,661 | Great Britain | July 11, 1944 |